(12) United States Patent
Schmidt

(10) Patent No.: US 9,047,077 B2
(45) Date of Patent: *Jun. 2, 2015

(54) VECTORIZATION IN AN OPTIMIZING COMPILER

(71) Applicant: International Business Machines Corporation, Armonk, NY (US)

(72) Inventor: William J. Schmidt, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 97 days.

This patent is subject to a terminal disclaimer.

(21) Appl. No.: 13/791,929

(22) Filed: Mar. 9, 2013

(65) Prior Publication Data

US 2014/0237460 A1   Aug. 21, 2014

Related U.S. Application Data

(63) Continuation of application No. 13/772,792, filed on Feb. 21, 2013.

(51) Int. Cl.
*G06F 9/44* (2006.01)
*G06F 9/45* (2006.01)
(Continued)

(52) U.S. Cl.
CPC ............ *G06F 9/3001* (2013.01); *G06F 8/4441* (2013.01); *G06F 8/433* (2013.01); *G06F 11/3688* (2013.01); *G06F 11/36* (2013.01); *G06F 8/41* (2013.01); *G06F 8/443* (2013.01)

(58) Field of Classification Search
CPC ........... G06F 8/443; G06F 8/41; G06F 8/452; G06F 9/45516; G06F 9/30036; G06F 8/4441; G06F 11/3612; G06F 11/3688; G06F 11/3684
See application file for complete search history.

(56) References Cited

U.S. PATENT DOCUMENTS

| 5,802,375 A | 9/1998 | Ngo et al. |
| 6,938,249 B2 | 8/2005 | Roediger et al. |
| 7,447,886 B2 | 11/2008 | Lee et al. |

(Continued)

OTHER PUBLICATIONS

Agner Fog; Optimizing software in C++ An optmization guide for Windows, Linux and Mac platform; 2004; Technical University of Denmark; retrieved online on Jan. 22, 2015; pp. 1-164; Retrieved from the Internet: <URL: http://www.agner.org/optimize/optimizing_cpp.pdf>.*

(Continued)

*Primary Examiner* — Thuy Dao
*Assistant Examiner* — Hanh T Bui
(74) *Attorney, Agent, or Firm* — Martin & Associates, LLC (57) ABSTRACT

An optimizing compiler includes a vectorization mechanism that optimizes a computer program by substituting code that includes one or more vector instructions (vectorized code) for one or more scalar instructions. The cost of the vectorized code is compared to the cost of the code with only scalar instructions. When the cost of the vectorized code is less than the cost of the code with only scalar instructions, the vectorization mechanism determines whether the vectorized code will likely result in processor stalls. If not, the vectorization mechanism substitutes the vectorized code for the code with only scalar instructions. When the vectorized code will likely result in processor stalls, the vectorization mechanism does not substitute the vectorized code, and the code with only scalar instructions remains in the computer program.

11 Claims, 11 Drawing Sheets

(51) Int. Cl.
*G06F 9/30* (2006.01)
*G06F 11/36* (2006.01)

(56) References Cited

U.S. PATENT DOCUMENTS

| | | | |
|---|---|---|---|
| 7,743,366 B2 | 6/2010 | Wezelenburg et al. | |
| 7,962,906 B2 | 6/2011 | O'Brien et al. | |
| 8,032,875 B2* | 10/2011 | Kosche et al. | 717/154 |
| 8,166,462 B2* | 4/2012 | Kosche et al. | 717/154 |
| 8,578,348 B2 | 11/2013 | Fliess et al. | |
| 8,612,949 B2* | 12/2013 | Liao et al. | 717/150 |
| 8,752,021 B2* | 6/2014 | Li et al. | 717/127 |
| 8,826,254 B2 | 9/2014 | Gounares et al. | |
| 2002/0108107 A1* | 8/2002 | Darnell et al. | 717/154 |
| 2004/0003381 A1* | 1/2004 | Suzuki et al. | 717/150 |
| 2005/0149918 A1* | 7/2005 | Liu et al. | 717/154 |
| 2005/0273769 A1 | 12/2005 | Eichenberger et al. | |
| 2008/0250399 A1 | 10/2008 | Huang et al. | |
| 2013/0073837 A1* | 3/2013 | Li et al. | 712/222 |
| 2013/0074057 A1* | 3/2013 | Gounares et al. | 717/154 |
| 2013/0205281 A1* | 8/2013 | Pizlo et al. | 717/128 |
| 2013/0205286 A1* | 8/2013 | Barraclough et al. | 717/151 |

OTHER PUBLICATIONS

Leonid Oliker et al.; Leading Computational Methods on Scalar and Vector HEC Platforms; ACM/IEEE 2005; retrieved online on Jan. 22, 2015; pp. 1-13; Retrieved from the Internet: <URL: http://delivery.acm.org/10.1145/1110000/1105827/27580062.pdf?>.*

Alvanos, Michail, "Auto-Vectorization with little help!", https://sites.google.com/site/malvanos/tutorials/auto-vectorize, printed Jan. 25, 2013.

"Multi-Core Software", Intel Technology Journal, http://www.intel.com/technology/itj/2007/v11i4/1-inside/5-vectorizer.htm, printed Jan. 25, 2013.

Yuanyuan et al., "An Open64-based cost analytical model in auto-vectorization", 2010 International Conference on Educational and Information Technology (ICEIT 2010).

Linthicum, Tony, "RFC: vectorizer cost model", http://readlist.com/lists/gcc.gnu.org/gcc/1/9402.html, Feb. 16, 2007.

Pouchet, Louis-Noel, "Transfomation Selection for Good Vectorization", Nov. 2010.

Stock et al., "Using Machine Learning to Improve Automatic Vectorization", ACM Transactions on Architecture and Code Optimization, vol. V, No. N., printed Jan. 25, 2013.

Park et al., "Predictive Modeling in a Polyhedral Optimization Space", International Journal of Parallel Programming, vol. 41, Issue 5, pp. 704-750, Oct. 2013.

Mita, Guarav, "Use of SIMD Vector Operations to Accelerate Application Code Performance on Low-Powered ARM and Intel Platforms", 2013 IEEE 27th International Symposium on Parallel & Distributed Processing Workshops and PhD Forum, p. 1107-1116.

Asanovic, Krste, "Vector Processors", Appendix G, Department of Electrical Engineering and Computer Science, MIT; 2003.

Hnat et al., "MacroLab: A Vector-based Macroprogramming Framework for Cyber-Physical Systems", ACM 2008, p. 225-238.

* cited by examiner

FIG. 1

```
subroutine example1(n,x,y,z,max)
      integer k,n
      real*4 x(n),y(n),z(n)

do k = 1, n-2
        x(k) = y(k+1) * z(k+2)
        if (x(k).gt.max) max = x(k)
      enddo return
```

FIG. 2

```
loop:
   scalar-add    yptr = &y, i
   scalar-add    zptr = &z, i
   scalar-load   yelt = *(yptr + 4)
   scalar-load   zelt = *(zptr + 8)
   scalar-mult   tmp = yelt, zelt
   scalar-store  *(&x + i) = tmp
   scalar-max    max = max, tmp
   scalar-add    i = i, 4
   decr-branch   loop
```

FIG. 3

```
loop:
  scalar-add   yptr = yadj, i
  scalar-add   zptr = zadj, i
  vector-load  y_qw2 = *(yptr)
  vector-load  z_qw2 = *(zptr)
  vector-perm  yelts = y_qw1, y_qw2, y_shift
  vector-copy  y_qw1 = y_qw2
  vector-perm  zelts = z_qw1, z_qw2, z_shift
  vector-copy  z_qw1 = z_qw2
  vector-mult  tmp = yelts, zelts
  vector-store *(&x, i) = tmp
  scalar-max   max = max, tmp[0]
  scalar-max   max = max, tmp[1]
  scalar-max   max = max, tmp[2]
  scalar-max   max = max, tmp[3]
  scalar-add   i = i, 16
  decr-branch  loop
```

FIG. 4

```
subroutine example2(n,x,y,z,m,p,q)
integer k,n
real*4 x(n),y(n),z(n),m(n),p(n),q(n)

do k = 1, n-2
  x(k) = y(k+1) * z(k+2) + p(k+1) - q(k+2)
  m(k) = p(k+1) * q(k+2) + z(k+2) - y(k+1)
enddo return
```

FIG. 5

```
loop:
    scalar-add   yptr = &y, i
    scalar-add   zptr = &z, i
    scalar-add   pptr = &p, i
    scalar-add   qptr = &q, i
    scalar-load  yelt = *(yptr + 4)
    scalar-load  zelt = *(zptr + 8)
    scalar-load  pelt = *(pptr + 4)
    scalar-load  qelt = *(qptr + 8)
    scalar-fmadd tmp1 = yelt, zelt, pelt
    scalar-fmadd tmp2 = qelt, qelt, zelt
    scalar-sub   tmp3 = tmp1, qelt
    scalar-sub   tmp4 = tmp2, yelt
    scalar-store *(&x + i) = tmp3
    scalar-store *(&m + i) = tmp4
    scalar-add   i = i, 4
    decr-branch  loop
```

FIG. 6

```
loop:
    scalar-add   yptr = yadj, i
    scalar-add   zptr = zadj, i
    scalar-add   pptr = padj, i
    scalar-add   qptr = qadj, i
    vector-load  y_qw2 = *(yptr)
    vector-load  z_qw2 = *(zptr)
    vector-load  p_qw2 = *(pptr)
    vector-load  q_qw2 = *(qptr)
    vector-perm  yelts = y_qw1, y_qw2, y_shift
    vector-copy  y_qw1 = y_qw2
    vector-perm  zelts = z_qw1, z_qw2, z_shift
    vector-copy  z_qw1 = z_qw2
    vector-perm  pelts = p_qw1, p_qw2, p_shift
    vector-copy  p_qw1 = p_qw2
    vector-perm  qelts = q_qw1, q_qw2, q_shift
    vector-copy  q_qw1 = q_qw2
    vector-fmadd tmp1 = yelts, zelts, pelts
    vector-fmadd tmp2 = pelts, qelts, zelts
    vector-sub   tmp3 = tmp1, qelts
    vector-sub   tmp4 = tmp2, yelts
    vector-store *(&x, i) = tmp3
    vector-store *(&m, i) = tmp4
    scalar-add   i = i, 16
    decr-branch  loop
```

$$\text{Vector Instruction Density} = \frac{\text{\# Vector Instructions}}{\text{\# Total Instructions}}$$

$$\text{Vector Cost Density} = \frac{\text{Cost of Vector Instructions}}{\text{Cost of Total Instructions}}$$

VECTORIZATION IN AN OPTIMIZING COMPILER

BACKGROUND

1. Technical Field

This disclosure generally relates to computer systems, and more specifically relates to compilers that generate executable code for computer systems.

2. Background Art

Computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number and complexity of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Many different optimizations have been developed so the code produced by compilers has better run-time performance. One such optimization is converting scalar instructions, such as those in a loop, to vectorized instructions, known as vectorization. Known vectorization methods can produce vectorized code that actually reduces the performance of the computer program.

BRIEF SUMMARY

An optimizing compiler includes a vectorization mechanism that optimizes a computer program by substituting code that includes one or more vector instructions (vectorized code) for one or more scalar instructions. The cost of the vectorized code is compared to the cost of the code with only scalar instructions. When the cost of the vectorized code is less than the cost of the code with only scalar instructions, the vectorization mechanism determines whether the vectorized code will likely result in processor stalls. If not, the vectorization mechanism substitutes the vectorized code for the code with only scalar instructions. When the vectorized code will likely result in processor stalls, the vectorization mechanism does not substitute the vectorized code, and the code with only scalar instructions remains in the computer program. One way to determine when the vectorized code will likely result in processor stalls is to compute a vector instruction density or vector cost density.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

Most computer processors in common use today include a vector processing unit. The vector processing unit is responsible for executing a subclass of the instruction set architecture that performs single-instruction, multiple-data operations. That is, the same operation is performed simultaneously on multiple register values during the same unit of processing time.

For example, the PowerPC architecture includes sixty-four 128-bit vector registers. The contents of a vector register may be treated as a single 128-bit quadword, two 64-bit doublewords, four 32-bit words, eight 16-bit halfwords, or sixteen 8-bit bytes. All of these values may be interpreted as signed or unsigned integers, or, in the case of 32-bit words and 64-bit doublewords, IEEE floating-point values. The PowerPC instruction set architecture includes many instructions that operate on the vector registers using these different interpretations. As an example, the "vxmuldp" instruction (VSX Vector Multiply Double-Precision) multiplies the leftmost 64 bits of register A by the leftmost 64 bits of register B as double-precision floating-point values, placing the result in the leftmost 64-bits of register C, while simultaneously performing the identical operation on the rightmost 64 bits of registers A, B, and C.

Vector instructions are very important to high-performance computing applications, which typically perform uniform operations on large arrays of data. Nested loops are used to access array elements in a predictable pattern, often sequential or incrementing an array index by a fixed amount during each loop iteration. For processing such loops, vector instructions are superior to their scalar counterparts. If a loop is operating on 32-bit values, a processor with 128-bit vector registers can perform the same operations using about one quarter of the instructions. Assuming the instructions are well-scheduled on a pipelined, superscalar processor, this can produce up to a fourfold improvement in processing time.

Because different instruction set architectures contain different vector capabilities and implementations, it is not practical for the programmer of a high-performance computing application to directly manipulate the vector registers. This would require writing in non-portable assembly code, which would have to be rewritten for each target instruction set architecture. Instead, the job of effectively utilizing vector registers and single instruction, multiple data instructions falls to the compiler. Compilers are capable of performing considerable analysis on loops and determining when a scalar loop can be converted into a loop that makes use of vector instructions. This process is known as "vectorization." The vectorized loop will have fewer iterations than the scalar loop. When four 32-bit values are packed into a single 128-bit register for the loop operations, we say that the "vectorization factor" is four.

Deciding whether or not a loop should be vectorized can be quite important to the overall performance of a high-performance computing application. Such applications by their nature spend a preponderance of their processing time in loops. If a loop can be profitably vectorized, large speedups are possible. Conversely, if the vector instructions end up being less efficient than the original scalar instructions, performance can suffer greatly. Therefore it is highly important that the vectorizer make accurate decisions about which loops to vectorize.

Known optimizing compilers make vectorization decisions based on a simple cost model. In other words, if the vectorized instructions require less processing time than the scalar instruction counterparts, the vectorized instructions are substituted for the scalar instructions. However, the simple cost model does not account for processor stalls that can occur due to the interaction of instructions that may cause run-time latencies between dependent instructions, overutilization of scarce resources, pipeline conflicts, and so forth. Indeed, such detailed modeling is impossible for the high-level vectorizer pass in the compiler, since the compiler does not know ultimately how the instructions will be scheduled by the low-level instruction scheduling pass that will occur later, and what effects other intervening optimization phases may have on the vectorized loop. The net result in the prior art is optimizing compilers can make vectorization decisions that actually decrease the performance of the code due to processor stalls.

The claims and disclosure herein provide an optimizing compiler that includes a vectorization mechanism that optimizes a computer program by substituting code that includes one or more vector instructions (vectorized code) for one or more scalar instructions. The cost of the vectorized code is compared to the cost of the code with only scalar instructions. When the cost of the vectorized code is less than the cost of the code with only scalar instructions, the vectorization mechanism determines whether the vectorized code will likely result in processor stalls. If not, the vectorization mechanism substitutes the vectorized code for the code with only scalar instructions. When the vectorized code will likely result in processor stalls, the vectorization mechanism does not substitute the vectorized code, and the code with only scalar instructions remains in the computer program. The result is a more intelligent vectorization mechanism that avoids vectorizing code when the potential for the vectorized code to cause processors stalls is high.

Figure 1:
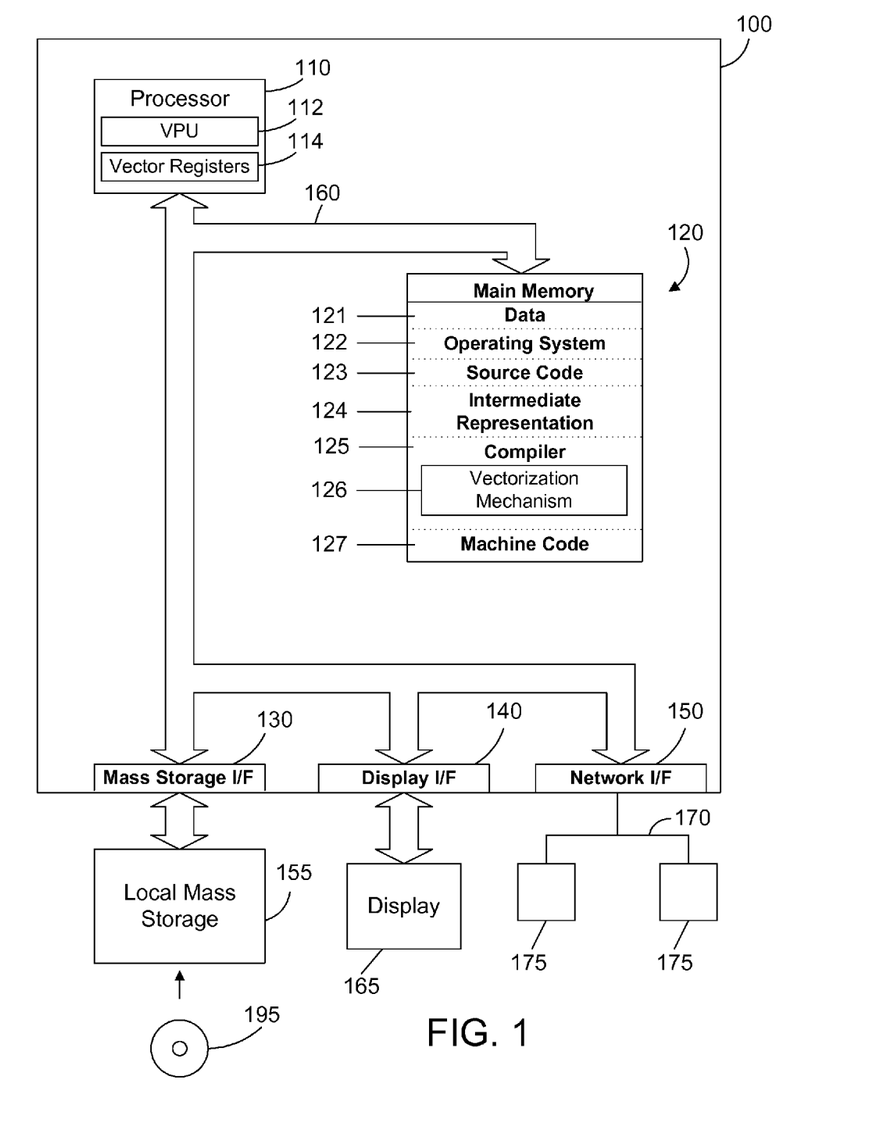
FIG. 1 is a block diagram of an apparatus that includes a vectorization mechanism in an optimizing compiler.

Referring to FIG. 1, a computer system 100 is one suitable implementation of a computer system that includes an optimizing compiler with a vectorization mechanism that performs vectorization for loops in a computer program. Computer system 100 is an IBM zEnterprise System computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, source code 123, an intermediate representation 124, a compiler 125, and machine code 127. Data 121 represents any data that serves as input to or output from any program in computer system 100. Operating system 122 is a multitasking operating system. There are three different representations of a computer program in FIG. 1, namely the high-level source code 123, the intermediate representation 124 that is generated by a front-end compiler from the source code 123, and the machine code 127 that is generated by a back-end compiler from the intermediate representation 124. The compiler 125 is preferably an optimizing back-end compiler that compiles the intermediate representation 124 and generates the machine code 127. Compiler 125 may also be used to generate the intermediate representation 124 from the source code 123, or this may be done using a different compiler. The compiler 125 includes a vectorization mechanism 126 that analyzes the computer program and makes decisions regarding vectorization based on likelihood of processor stalls. In the examples herein, the compiler 125 operates on the intermediate representation 124 of the computer program. However, the compiler 125 could also operate on the source code 123 as well.

Note the source code 123, intermediate representation 124, compiler 125, and machine code 127 are all shown residing in memory 120 for the convenience of showing all of these elements in one drawing. One skilled in the art will appreciate that this is not the normal mode of operation for most compilers. A front-end compiler processes source code 123 and generates therefrom intermediate representation 124. This processing may occur on a computer system separate from computer system 100. Compiler 125 processes intermediate representation 124 and generates therefrom machine code 127, which may also occur on a separate computer system. In the extreme, source code 123 could reside on a first computer system and a front-end compiler could reside on a second computer system. The front-end compiler could read the source code 123 from the first computer system, generate the intermediate representation 124, and store the intermediate representation 124 on a third computer system. Compiler 125 could be executed on a fourth computer system, which reads the intermediate representation 124 from the third computer system, and generates therefrom machine code 127, which could be written to a fifth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, source code 123, intermediate representation 124, compiler 125, and machine code 127 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 includes a vector processing unit 112 that performs operations on vector registers 114 according to a defined vector instruction set that includes vector instructions. Processor 110 executes program instructions stored in main memory 120. Main memory 120 stores programs and data that processor 110 may access. When computer system 100 starts up, processor 110 initially executes the program instructions that make up operating system 122. Processor 110 also executes the compiler 125.

The VPU 112 and vector registers 114 are shown in FIG. 1 to illustrate that the code generated by compiler 125 is code that will run on a processor with these features. The processor 110 that executes the compiler 125 need not necessarily include a VPU 112 and vector registers 114.

Although computer system 100 is shown to contain only a single processor and a single system bus, those skilled in the art will appreciate that an optimizing compiler as taught herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
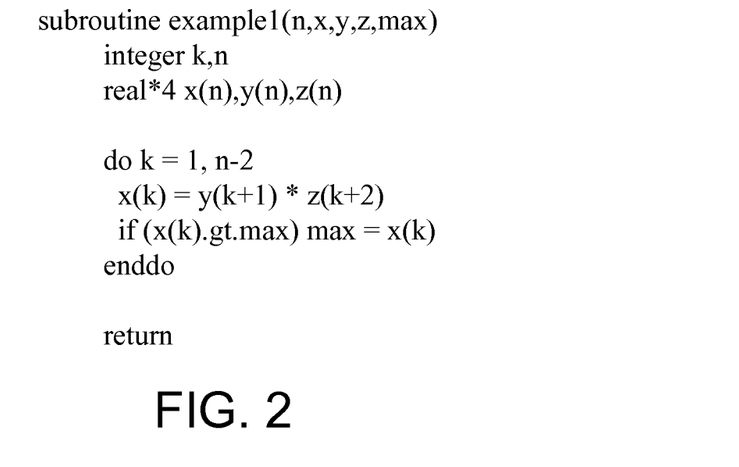
FIG. 2 is a diagram showing a first sample snippet of Fortran code.

Referring to FIG. 2, a sample Fortran subroutine called example1 is shown to illustrate vectorization of loops in a computer program. The subroutine in FIG. 2 is one suitable example of source code 123 shown in FIG. 1. The code in FIG. 2 accepts an integer n, pointers to arrays x, y, and z, and a floating-point value max. Each array consists of n four-byte floating-point values. The values in y and z are used to modify the values in x, and max is updated if any results exceed it.

Figure 3:
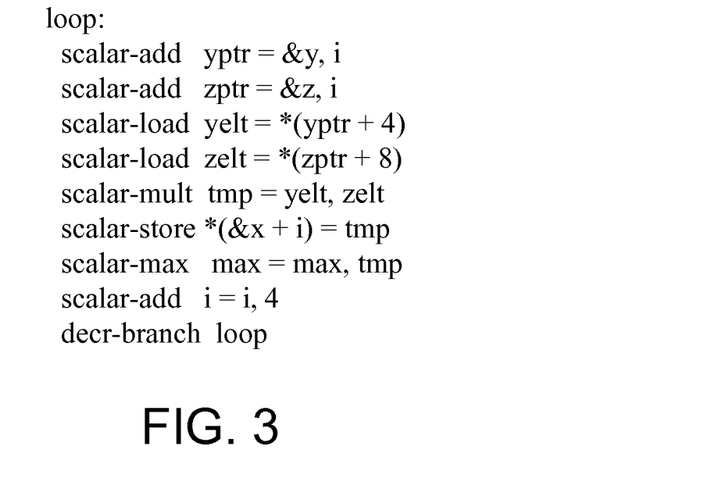
FIG. 3 is a diagram showing an intermediate code representation that includes only scalar instructions for the code shown in FIG. 2.

FIG. 3 shows a representation of one scalar iteration of this loop in intermediate representation 124 in FIG. 1. In FIG. 3, "&y" means the beginning address of the array y; *(yptr+4) means to add 4 to the address stored in yptr and either load from or store to the resulting address; and "decr-branch" means to decrement the register that contains the number of loop iterations (initially k) and branch back to the top of the loop if the result is not zero. For simplicity, assume that each scalar instruction has a cost of one. Counting the branch, this loop iteration then has a cost of nine.

Suppose that this code is compiled for a machine that can operate on four four-byte floating-point values at once, using 16-byte vector registers. Then this code is a prime candidate for automatic vectorization. Four values of y and four values of z can be processed in parallel to produce four values of x during each iteration of a vectorized loop, and only a fourth of the number of iterations will be needed.

Suppose further that the machine can only load into and store from vector registers if the values to be accessed are aligned in memory on a 16-byte boundary. In the case of the example1 subroutine in FIG. 2, the compiler has no knowledge regarding the alignment of the arrays x, y, and z. To handle this, the alignment of the arrays will be detected at runtime outside the loop, and represented by a "shift vector" for each array. The first 16-byte "quadword" of memory that contains part of each source array y and z is loaded outside the loop as well.

Each iteration of the loop loads the next 16-byte quadword. A "vector permute" instruction is used to select the correct four elements from the two most recently loaded quadwords, using the shift vector for the corresponding array, and place them into a single vector register. Once the possibly misaligned values have been loaded correctly, vector arithmetic instructions may be performed straightforwardly.

The output array x can be assumed to be aligned within the loop by performing up to 3 scalar iterations prior to the vectorized loop. Note that aligning x will probably misalign y and z, since their elements are accessed at offsets that are not divisible by four. For such reasons, in general we cannot align all arrays in this manner.

Figure 4:
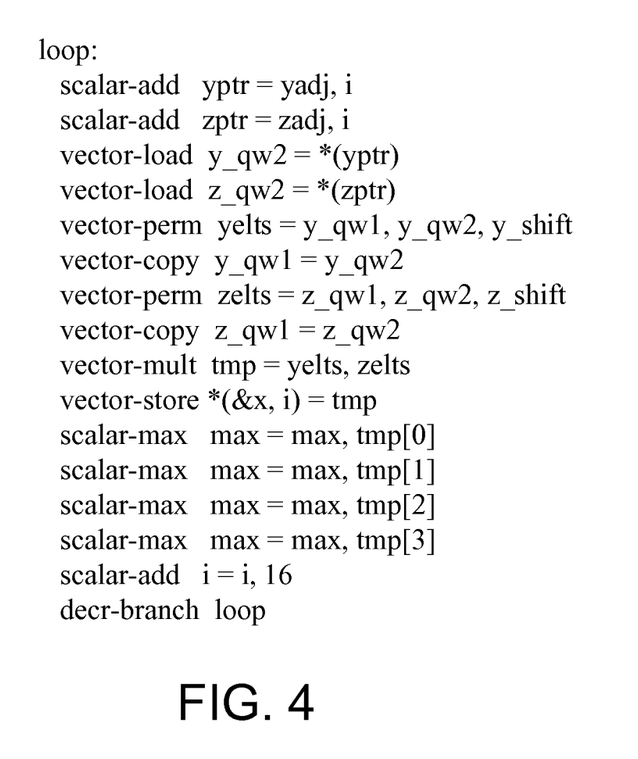
FIG. 4 is a diagram showing an intermediate code representation for the code shown in FIG. 2 that includes vector instructions.

For purposes of illustration, assume that the "maximum" operation cannot be vectorized. Then an iteration of the vectorized loop for the example1 subroutine in FIG. 2 would appear as shown in FIG. 4, where yadj is the address of y with its low-order 4 bits cleared to produce a 16-byte-aligned address; y_qw1 and y_qw2 are the two quadwords that contain the four elements of y in which we are interested, with y_qw1 initialized outside the loop; and y_shift is the vector shift register, also initialized outside the loop, that tells the vector-perm instruction which values to select from y_qw1 and y_qw2.

Assume that all vector and scalar instructions have a cost of one, except for the vector-perm instruction, which has a cost of four. The cost of a single vectorized iteration is then 22, counting the branch. Since a single vectorized iteration corresponds to four scalar iterations, the vectorized cost of 22 is significantly less than the equivalent scalar cost of 9×4=36, so this loop is profitable to vectorize.

Figure 5:
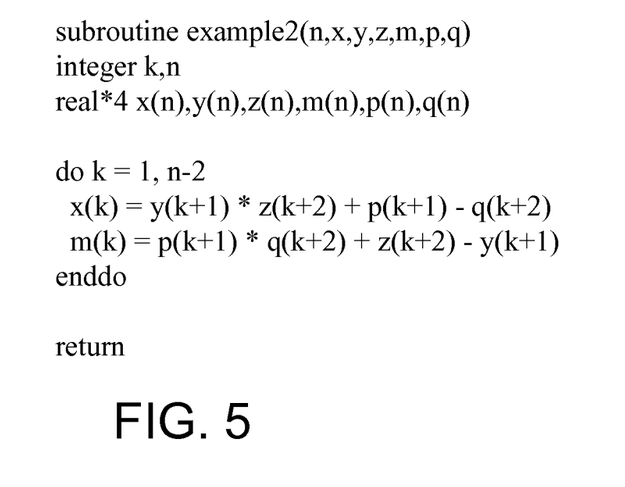
FIG. 5 is a diagram showing a second sample snippet of Fortran code.
Figure 6:
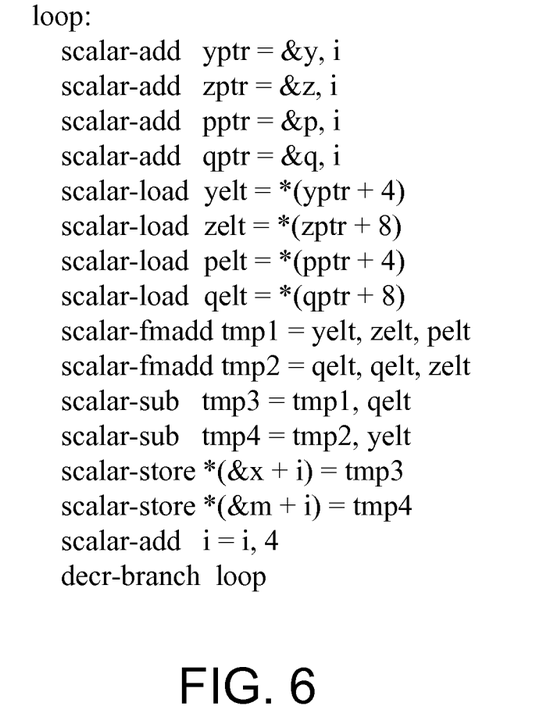
FIG. 6 is a diagram showing an intermediate code representation that includes only scalar instructions for the code shown in FIG. 5.

For a second example, consider the example2 Fortran subroutine shown in FIG. 5. All of the earlier assumptions with respect to example1 remain in force. One possible scalar iteration of the loop is shown in FIG. 6. Here, "scalar-fmadd a, b, c" represents a single instruction to multiply a by b and add c. We assume all scalar instructions have a cost of one, so this loop iteration has a total cost of 16.

Figure 7:
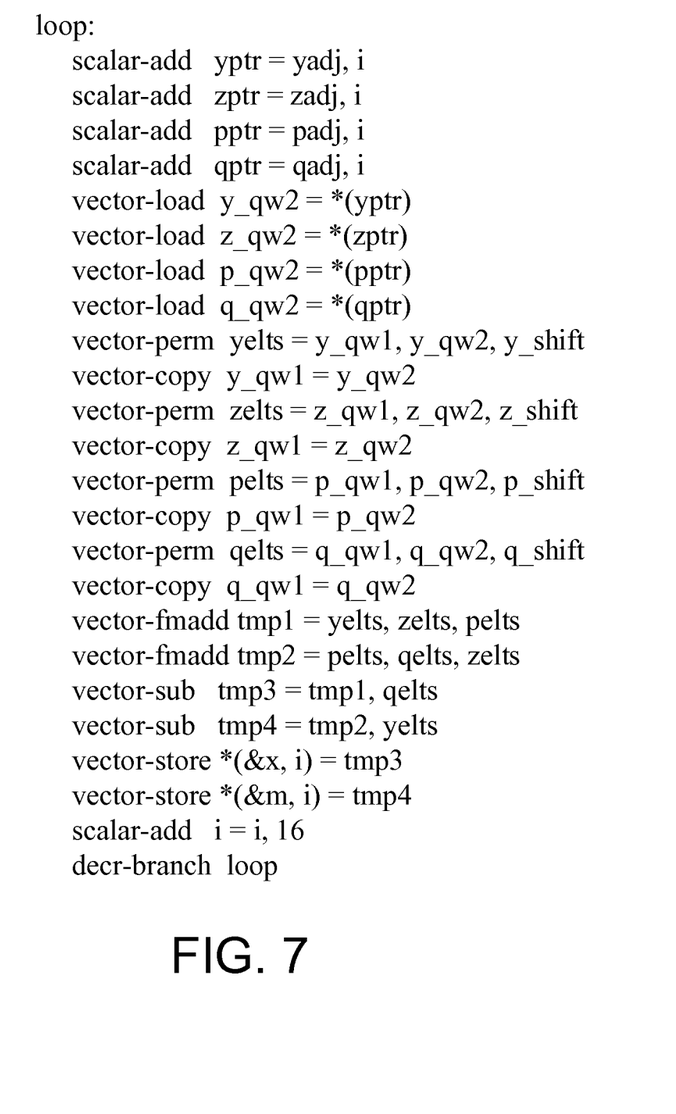
FIG. 7 is a diagram showing an intermediate code representation for the code shown in FIG. 5 that includes vector instructions.

Now, one possible vectorized iteration of this loop is shown in FIG. 7. Assume that all instructions have a cost of one, except vector-perm has a cost of four and vector-fmadd has a cost of two. Then the total cost of a vectorized iteration is 38. Since this is smaller than 16×4=64, the loop again appears to be profitable to vectorize.

Figure 8:
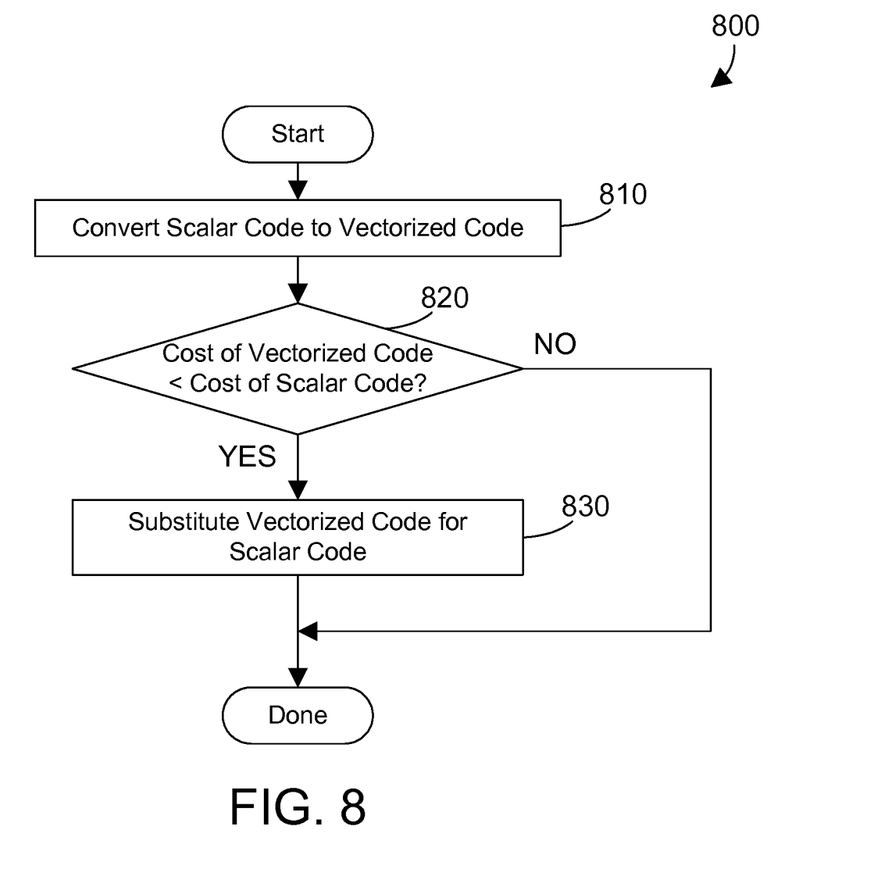
FIG. 8 is a flow diagram of a method for converting scalar code to vectorized code using a simple cost model.

Referring to FIG. 8, a method 800 is one way to perform vectorization. Scalar code is converted to vectorized code (step 810). For the examples in FIGS. 2-7, step 810 is the step of converting the scalar code in FIG. 3 to the vectorized code in FIG. 4, and the step of converting the scalar code in FIG. 6 to the vectorized code in FIG. 7. If the cost of the vectorized code is less than the cost of the scalar code (step 820=YES), the vectorized code is substituted for the scalar code in the computer program (step 830). If the cost of the vectorized code is not less than the cost of the scalar code (step 820=NO), no substitution of vectorized code is performed, and the scalar code remains in the computer program. Method 800 is then done.

Method 800 uses a simple cost comparison between the scalar code and the vectorized code to determine whether to substitute the vectorized code into the computer program. However, such a simple cost comparison could mask run-time problems that could actually make the vectorized code run less efficiently than the scalar code. For example, if the vectorized code has a large number of vector instructions, the vector processing unit in the processor may have to delay issuing vector instructions until the vector processing unit is free. That is, the processor may stall. In this scenario, the simple cost model would not accurately reflect the cost of the vectorized loop because the potential for the processor to stall is not reflected in the simple cost model.

Figure 9:
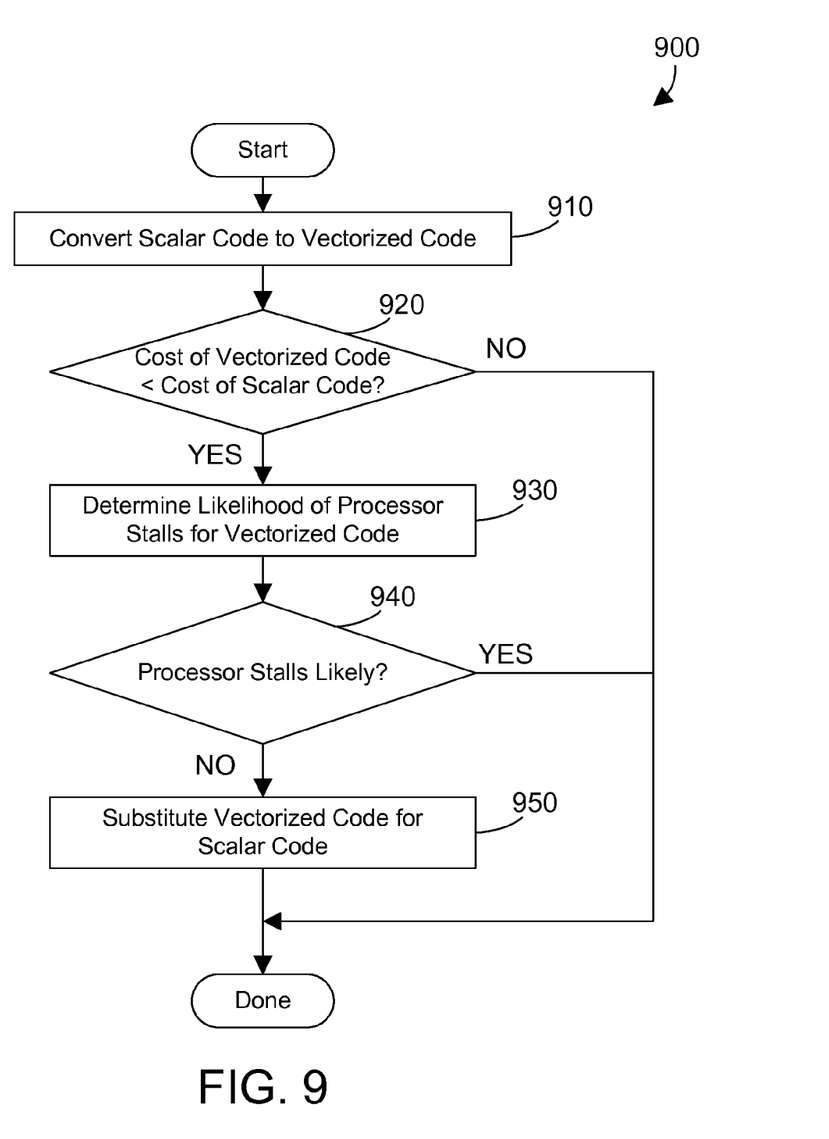
FIG. 9 is a flow diagram of a method for converting scalar code to vectorized code that takes the likelihood of processor stalls into account.

Referring to FIG. 9, a method 900 takes into account whether processor stalls are likely in determining whether or not to substitute vectorized code for scalar code. The scalar code is converted to vectorized code (step 910). When the cost of the vectorized code is less than the cost of the scalar code (step 920=YES), method 900 determines likelihood of processor stalls for the vectorized code (step 930). When processor stalls are not likely (step 940=NO), the vectorized code is substituted for the scalar code in the computer program (step 950). When the cost of the vectorized code is not less than the cost of the scalar code (step 920=NO), or when the vectorized code makes processor stalls likely (step 940=YES), method 900 is done without performing the substitution of the vectorized code for the scalar code. In other words, the scalar code remains in the program, and the vectorized code is not used. By taking into account a likelihood of processor stalls in deciding whether or not to substitute vectorized code for scalar code, the vectorizer mechanism makes more intelligent vectorization decisions.

Figure 10:
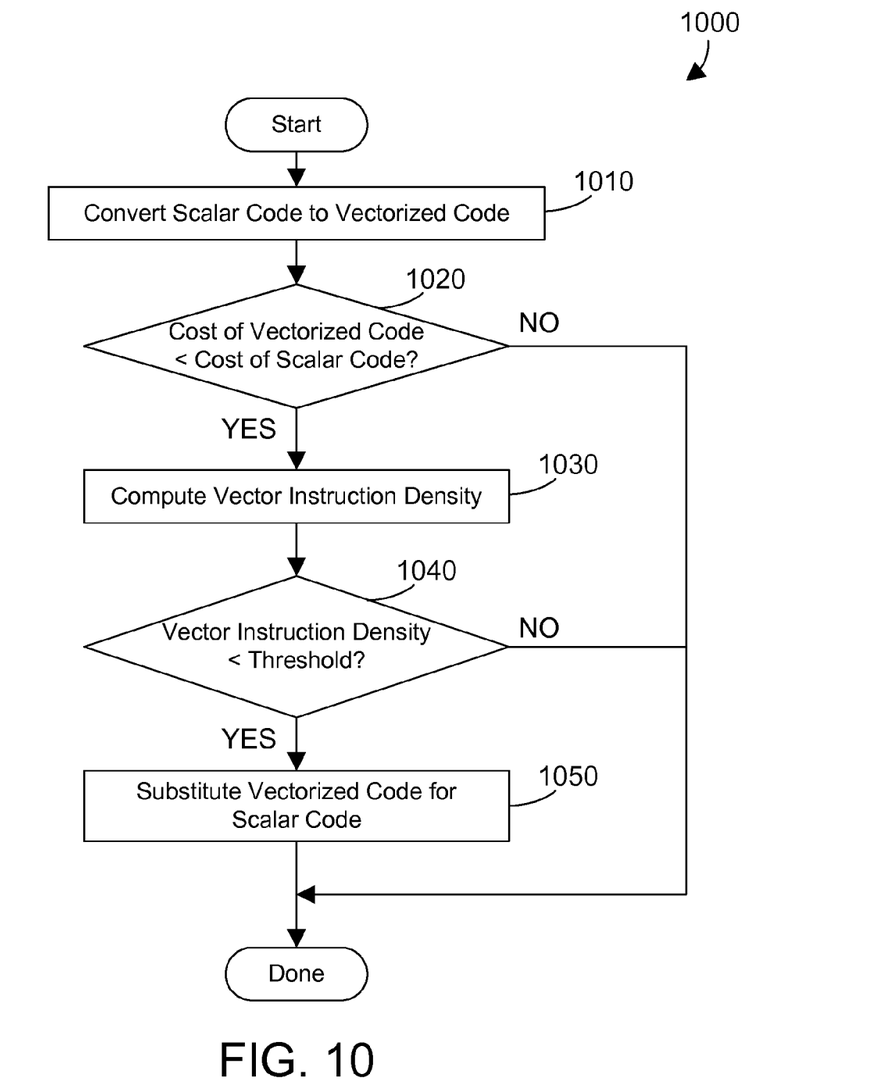
FIG. 10 is a flow diagram of a first specific implementation for method 900 in FIG. 9.
Figure 11:
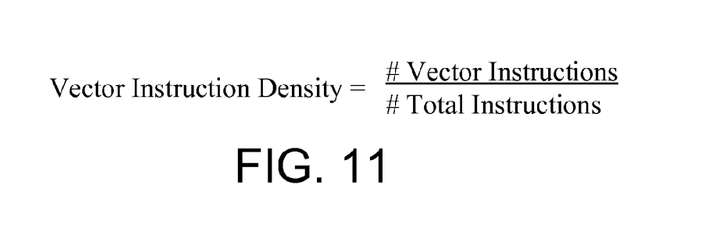
FIG. 11 is a formula for computing vector instruction density.

Because processor stalls are real-time events during run-time that depend on many different run-time factors, a compiler does not have all the information to accurately predict exactly when a processor stall will occur at run-time. Furthermore, detailed modeling is impossible for the high-level vectorizer pass in the compiler, since it cannot tell how the instructions will ultimately be scheduled by the low-level instruction scheduling pass that will occur later. However, the vectorizer mechanism can determine that processor stalls are likely in different ways. A first way is shown in method 1000 in FIG. 10, which represents a first specific implementation for method 900 in FIG. 9. Method 1000 begins by converting the scalar code to vectorized code (step 1010). When the cost of the vectorized code is less than the cost of the scalar code (step 1020=YES), the vector instruction density of the vectorized code is computed (step 1030). For this specific example, the vector instruction density is defined as shown in FIG. 11 to be the number of vector instructions in the vectorized code divided by the total number of instructions in the vectorized code. When the instruction density is less than a predefined threshold (step 1040=YES), the vectorized code is substituted for the scalar code in the computer program (step 1050). When the cost of the vectorized code is not less than the cost of the scalar code (step 1020=NO), or when the vector instruction density is not less than the threshold (step 1040=NO), method 1000 is done without performing the substitution of the vectorized code for the scalar code. The concept in the specific example in FIGS. 10 and 11 is straightforward: if the vector instruction density becomes too high, processor stalls become more likely. When processor stalls become too likely, the decision is made not to substitute the vectorized code for the scalar code.

Figure 12:
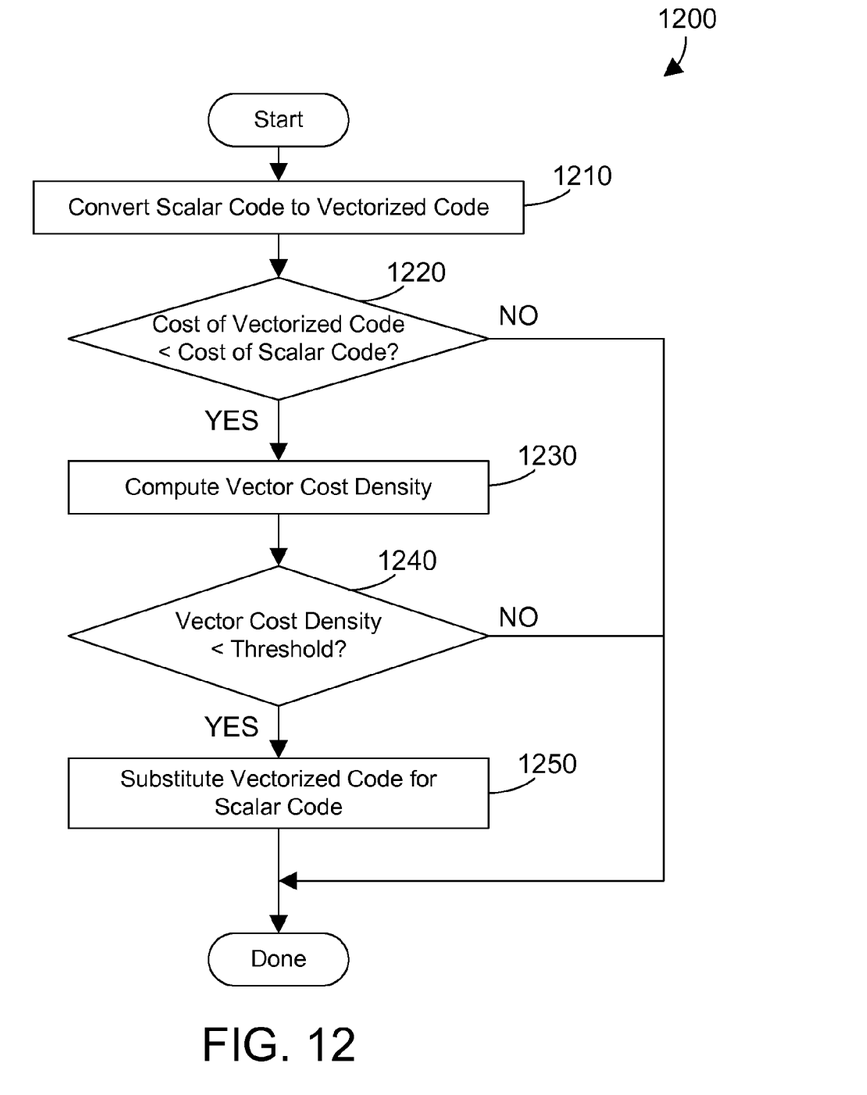
FIG. 12 is a flow diagram of a second specific implementation for method 900 in FIG. 9.
Figure 13:
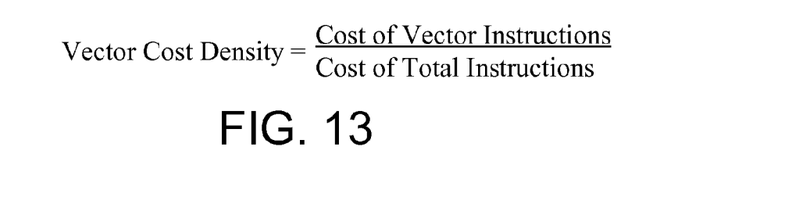
FIG. 13 is a formula for computing vector cost density.

A second way the vectorizer mechanism can determine that processor stalls are likely is shown in FIGS. 12 and 13. FIG. 12 represents a second specific implementation for method 900 in FIG. 9. Method 1200 begins by converting the scalar code to vectorized code (step 1210). When the cost of the vectorized code is less than the cost of the scalar code (step 1220=YES), the vector cost density of the vectorized code is computed (step 1230). For this specific example, the vector cost density is defined as shown in FIG. 13 to be the cost of vector instructions in the vectorized code divided by the total cost of instructions in the vectorized code. When the vector cost density is less than a predetermined threshold (step 1240=YES), the vectorized code is substituted for the scalar code in the computer program (step 1250). When the cost of the vectorized code is not less than the cost of the scalar code (step 1220=NO), or when the vector cost density is not less than the threshold (step 1240=NO), method 1200 is done without performing the substitution of the vectorized code for the scalar code. The concept in the specific example in FIGS. 12 and 13 is similarly straightforward to the previous example: if the vector cost density becomes too high, processor stalls become more likely. When processor stalls become too likely, the decision is made not to substitute the vectorized code for the scalar code.

Figure 14:
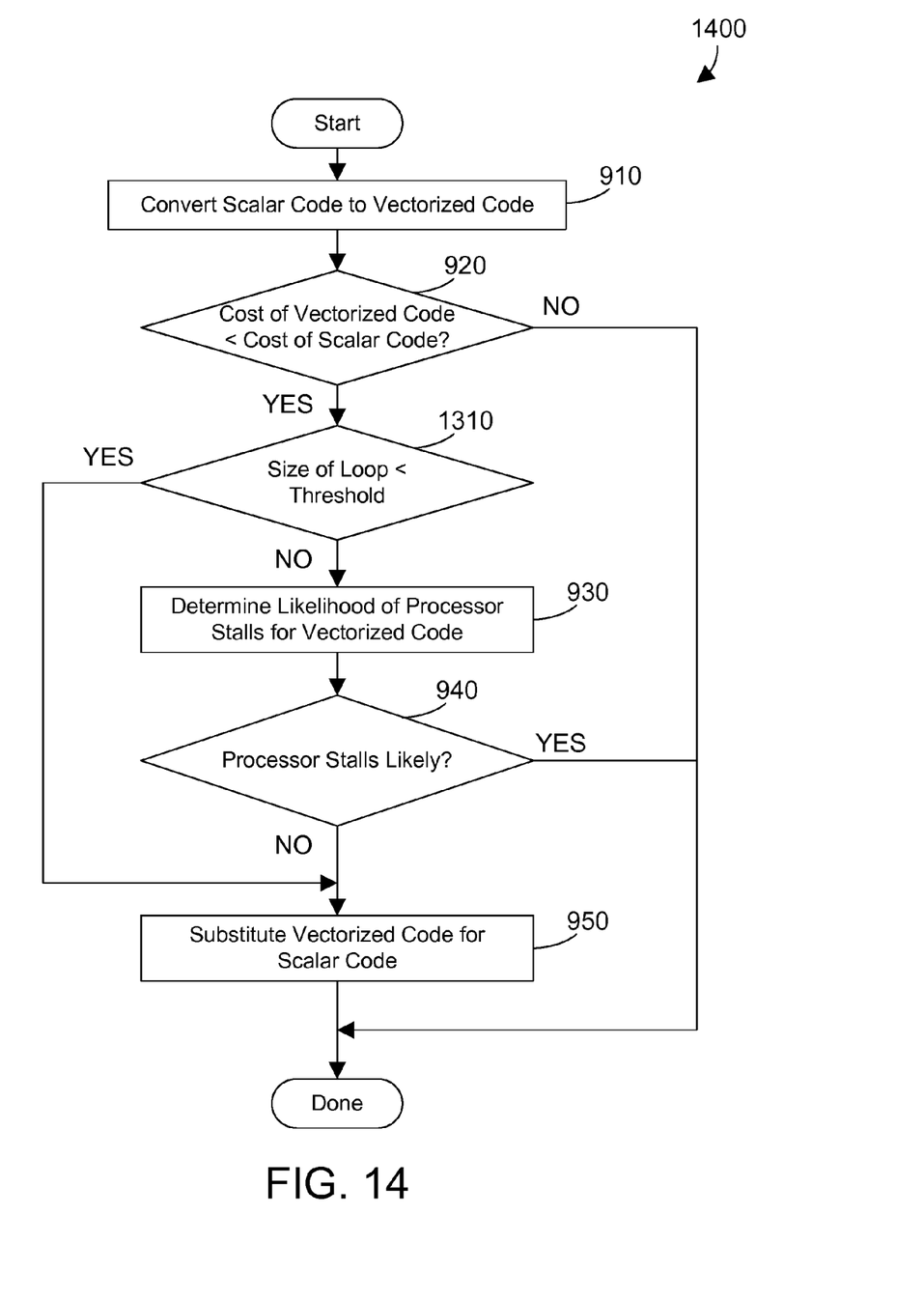
FIG. 14 is a flow diagram of a method that skips checking for processor stalls for small loops.

Referring to FIG. 14, method 1400 is similar in some respects to method 900 in FIG. 9 described in detail above, but with an additional check at step 1310. When the size of the loop is less than a specified loop threshold (step 1310=YES), method 1400 skips the checks at steps 930 and 940 that determine whether processor stalls are likely, and substitutes the vectorized code for the scalar code (step 950). Method 1400 recognizes that likelihood of processor stalls for small loops is small, and therefore bypasses steps 930 and 940 when the size of the loop is sufficiently small.

Note the examples herein are extremely simplified for the purpose of illustration. In a real-world example, more instructions than shown in the two examples in FIGS. 2-7 would be required to cause a modern processor to begin stalling. However, the concepts herein will be clear to one of ordinary skill in the art. Should processor stalls become likely, as indicated by either vector instruction density or vector cost density or some other metric or heuristic, a decision will be made not to vectorize a loop that would normally be vectorized using the simple cost model used in method 800 in FIG. 8.

We now examine the examples in FIGS. 2-7 using method 1000 in FIG. 10. The previous discussion of FIGS. 2-7 show the cost of the vectorized code is less than the cost of the scalar code, so step 1020=YES in FIG. 10. For the vectorized code in FIG. 4 ignoring the branch instruction, the vector instruction density is $8/(8+7)=0.533$. We assume for this example a threshold of 0.7 has been selected. For the example in FIG. 4 using method 1000 in FIG. 10, because the computed vector instruction density of 0.533 is less than the threshold of 0.7 (step 1040=YES), the vectorized code in FIG. 4 will be substituted for the scalar code in FIG. 3 in the computer program (step 1050). For the vectorized code in FIG. 7, the vector instruction density is $18/(18+5)=0.783$. For the example in FIG. 7 using method 1000 in FIG. 10, because the computed vector instruction density of 0.7826 is not less than the threshold of 0.7 (step 1040=NO), the vectorized code is not substituted for the scalar code. We see from this simple example how vector instruction density serves as an indicator of whether processor stalls are likely, and vectorization decisions can be made accordingly.

Next we examine the examples in FIGS. 2-7 using method 1200 in FIG. 12. The previous discussion of FIGS. 2-7 show the cost of the vectorized code is less than the cost of the scalar code, so step 1220=YES in FIG. 12. For the vectorized code in FIG. 4, the vector cost density is 14/(14+7)=0.667. We assume for this example a threshold of 0.75 has been selected. For the example in FIG. 4 using method 1200 in FIG. 12, because the computed vector cost density of 0.667 is less than the threshold of 0.75 (step 1240=YES), the vectorized code in FIG. 4 will be substituted for the scalar code in FIG. 3 in the computer program (step 1250). For the vectorized code in FIG. 7, the vector cost density is 32/(32+5)=0.865. For the example in FIG. 7 using method 1200 in FIG. 12, because the computed vector cost density of 0.865 is not less than the threshold of 0.75 (step 1240=NO), the vectorized code is not substituted for the scalar code.

Note the thresholds for vector instruction density, instruction cost density, and loop size may be selected using any suitable metric, heuristic, or measurement method. In one specific implementation, test code is run to determine suitable thresholds based on run-time performance of the test code.

Figure 15:
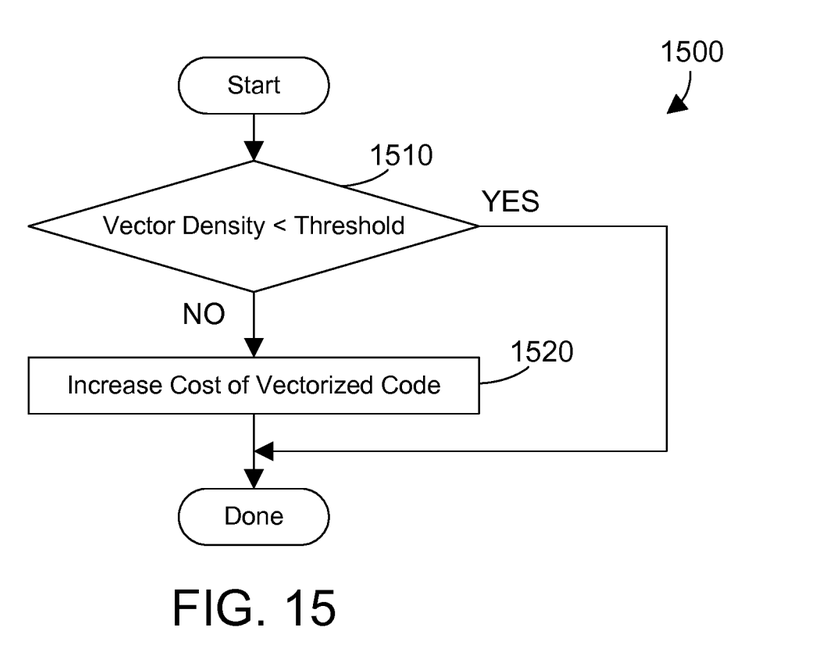
FIG. 15 is a flow diagram of a method for increasing cost of vectorized code.

In an alternative implementation, the cost of the vectorized code may be increased when the vector density is not less than the predetermined threshold, as shown in method 1500 in FIG. 15. When the vector density is not less than the predetermined threshold (step 1510=NO), the cost of the vectorization code may be increased (step 1520). Note the term "vector density" is used in FIG. 15 to include both vector instruction density as described in FIGS. 10-11 as well as vector cost density as described in FIGS. 12-13. One suitable way to increase the cost of the vectorization code is to multiply the cost of the vectorization code by some predetermined multiplier factor. For example, suppose we choose a vector density threshold of 0.75, and we want the cost of a loop to be gradually increased as its vector density rises, until it is doubled at a vector density of 1.0. Then if the standard cost model gives a vectorized cost of C and we measure a vector density of V, the cost C' could be represented by the following: C'=C when V<=0.75, and C'=C*(4V−2) when V>0.75. Thus when the vector density is 0.8, C'=C*(3.2−2)=1.2*C. In other words, the cost of the vectorized code is increased by 20% based on the predetermined multiplier factor. When the vector density is 0.95, C'=C*(3.8−2)=1.8*C. In other words, the cost of the vectorized code is increased by 80% based on the predetermined multiplier factor.

The claims and disclosure herein provide an optimizing compiler that includes a vectorization mechanism that optimizes a computer program by substituting code that includes one or more vector instructions (vectorized code) for one or more scalar instructions. The cost of the vectorized code is compared to the cost of the code with only scalar instructions. When the cost of the vectorized code is less than the cost of the code with only scalar instructions, the vectorization mechanism then computes a vector instruction density for the vectorized code. When the vector instruction density is less than a specified threshold, the vectorization mechanism substitutes the vectorized code for the code with only scalar instructions. When the vector instruction density is more than the specified threshold, the vectorization mechanism does not substitute the vectorized code, and the code with only scalar instructions remains in the computer program.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while computing vector instruction density or vector cost density are suitable ways to determine when processor stalls are likely to occur, the disclosure and claims herein extend to any suitable way to determine when processor stalls are likely to occur. In addition, while vectorizing loops is discussed herein, the disclosure and claims expressly extend to vectorizing any code, whether in a loop or not.

The invention claimed is:

1. An apparatus comprising:
   at least one processor;
   a memory coupled to the at least one processor;
   a computer program residing in the memory, the computer program including a plurality of instructions in an instruction set that includes a plurality of vector instructions that operate on data in a plurality of vector registers; and
   an optimizing compiler residing in the memory and executed by the at least one processor, the optimizing compiler including a vectorization mechanism that analyzes a portion of the computer program, generates from a first set of instructions in the computer program that does not include any of the plurality of vector instructions a second set of instructions that includes at least one of the plurality of vector instructions, determines when a second cost of processing the second set of instructions is less than a first cost of processing the first set of instructions, and when the second cost is less than the first cost, determining when the second set of instructions is likely to cause a processor running the computer program to stall when executing the second set of instructions by determining a ratio of vector instructions in the second set of instructions to total instructions in the second set of instructions, and when the second set of instructions is not likely to cause the processor running the computer program to stall when executing the second set of instructions, the vectorization mechanism substitutes the second set of instructions for the first set of instructions in the computer program, and when the second cost is not less than the first cost or when the second set of instructions is likely to cause the processor running the computer program to stall when executing the second set of instructions, the vectorization mechanism does not substitute the second set of instructions for the first set of instructions in the computer program.

2. The apparatus of claim 1 wherein the vectorization mechanism determines when the second set of instructions is likely to cause the processor running the computer program to stall by determining when the ratio is less than a predetermined threshold value, the second set of instructions is not likely to cause the processor running the computer program to stall, and by determining when the ratio is greater than or equal to the predetermined threshold, the second set of instructions is likely to cause the processor running the computer program to stall.

3. The apparatus of claim 2 wherein the vectorization mechanism increases the second cost by a predetermined multiplier factor when the second cost exceeds the predetermined threshold.

4. The apparatus of claim 1 wherein the vectorization mechanism determines when the second set of instructions is likely to cause a processor running the computer program to stall when executing the second set of instructions only when a number of instructions in the second set of instructions exceeds a predetermined threshold.

5. The apparatus of claim 1 wherein the vectorization mechanism determines when the second set of instructions is likely to cause the processor running the computer program to stall by determining a ratio of cost of vector instructions in the second set of instructions to total cost of all instructions in the second set of instructions, and when the ratio is less than a predetermined threshold value, the second set of instructions is not likely to cause the processor running the computer program to stall, and when the ratio is greater than or equal to the predetermined threshold, the second set of instructions is likely to cause the processor running the computer program to stall.

6. An article of manufacture comprising software stored on a non-transitory computer readable storage medium, the software comprising:
an optimizing compiler including a vectorization mechanism that analyzes a portion of a computer program that includes a plurality of instructions for execution on at least one processor that includes a vector processing unit that processes a plurality of vector instructions that operate on data in a plurality of vector registers, generates from a first set of instructions in the computer program that does not include any of the plurality of vector instructions a second set of instructions that includes at least one of the plurality of vector instructions, determines when a second cost of processing the second set of instructions is less than a first cost of processing the first set of instructions, and when the second cost is less than the first cost, determining when the second set of instructions is likely to cause a processor running the computer program to stall when executing the second set of instructions by determining a ratio of vector instructions in the second set of instructions to total instructions in the second set of instructions, and when the second set of instructions is not likely to cause the processor running the computer program to stall when executing the second set of instructions, the vectorization mechanism substitutes the second set of instructions for the first set of instructions in the computer program, and when the second cost is not less than the first cost or when the second set of instructions is likely to cause the at least one processor to stall when executing the second set of instructions, the vectorization mechanism does not substitute the second set of instructions for the first set of instructions in the computer program.

7. The article of manufacture of claim 6 wherein the vectorization mechanism determines when the second set of instructions is likely to cause the processor running the computer program to stall by determining when the ratio is less than a predetermined threshold value, the second set of instructions is not likely to cause the processor running the computer program to stall, and by determining when the ratio is greater than or equal to the predetermined threshold, the second set of instructions is likely to cause the processor running the computer program to stall.

8. The article of manufacture of claim 7 wherein the vectorization mechanism increases the second cost by a predetermined multiplier factor when the second cost exceeds the predetermined threshold.

9. The article of manufacture of claim 6 wherein the vectorization mechanism determines when the second set of instructions is likely to cause a processor running the computer program to stall when executing the second set of instructions only when a number of instructions in the second set of instructions exceeds a predetermined threshold.

10. The article of manufacture of claim 6 wherein the vectorization mechanism determines when the second set of instructions is likely to cause the processor running the computer program to stall by determining a ratio of cost of vector instructions in the second set of instructions to total cost of all instructions in the second set of instructions, and when the ratio is less than a predetermined threshold value, the second set of instructions is not likely to cause the processor running the computer program to stall, and when the ratio is greater than or equal to the predetermined threshold, the second set of instructions is likely to cause the processor running the computer program to stall.

11. An apparatus comprising:
at least one processor;
a memory coupled to the at least one processor;
a computer program residing in the memory, the computer program including a plurality of instructions in an instruction set that includes a plurality of vector instructions that operate on data in a plurality of vector registers; and
an optimizing compiler residing in the memory and executed by the at least one processor, the optimizing compiler including a vectorization mechanism that performs the steps of:
analyzing a loop in the computer program;
generating from a first set of instructions in the computer program that does not include any of the plurality of vector instructions a second set of instructions that includes at least one of the plurality of vector instructions;
determining when a second cost of processing the second set of instructions is less than a first cost of processing the first set of instructions;
when the second cost is less than the first cost, performing the steps of:
determining when the second set of instructions contains a number of instructions greater than a specified loop instruction threshold;
when the second set of instructions contains a number of instructions greater than the specified loop threshold, performing the steps of:
determining a ratio of vector instructions in the second set of instructions to total instructions in the second set of instructions;
when the ratio is less than a predetermined threshold, increasing the second cost by a predetermined multiplier factor, and when the increased second cost is less than the predetermined threshold value, substituting the second set of instructions for the first set of instructions in the computer program; and
when the second cost is not less than the first cost or when the ratio of vector instruction in the second set of instructions is not less than the predetermined threshold, not substituting the second set of instructions for the first set of instructions in the computer program;
when the second set of instructions does not contain a number of instructions greater than the specified loop threshold, performing the step of:
substituting the second set of instructions for the first set of instructions in the computer program.

* * * * *